United States Patent
Giulietti et al.

(10) Patent No.: US 9,718,086 B2
(45) Date of Patent: Aug. 1, 2017

(54) RAKE SYSTEMS FOR ADDITIVE MANUFACTURING SYSTEMS

(71) Applicant: Hamilton Sundstrand Corporation, Charlotte, NC (US)

(72) Inventors: Diana Giulietti, Tariffville, CT (US); Kiley J. Versluys, Hartford, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 14/924,125

(22) Filed: Oct. 27, 2015

(65) Prior Publication Data
US 2017/0113242 A1    Apr. 27, 2017

(51) Int. Cl.
| | |
|---|---|
| *B05C 11/02* | (2006.01) |
| *B29C 67/00* | (2017.01) |
| *B29C 41/12* | (2006.01) |
| *B33Y 40/00* | (2015.01) |
| *B33Y 30/00* | (2015.01) |
| *B22F 3/105* | (2006.01) |

(52) U.S. Cl.
CPC ............ *B05C 11/02* (2013.01); *B05C 11/023* (2013.01); *B29C 41/12* (2013.01); *B29C 67/0085* (2013.01); *B33Y 40/00* (2014.12); *B22F 2003/1056* (2013.01); *B29C 67/0077* (2013.01); *B29C 67/0081* (2013.01); *B33Y 30/00* (2014.12)

(58) Field of Classification Search
None
See application file for complete search history.

(56) References Cited

U.S. PATENT DOCUMENTS

| | | | |
|---|---|---|---|
| 3,787,922 A * | 1/1974 | Foy ...................... | B65D 59/00 248/466 |
| 6,375,874 B1 | 4/2002 | Russell et al. | |
| 2003/0059492 A1 | 3/2003 | Gaillard et al. | |
| 2007/0074659 A1* | 4/2007 | Wahlstrom .......... | B29C 67/0066 118/679 |

FOREIGN PATENT DOCUMENTS

| | | |
|---|---|---|
| JP | H03243515 A | 10/1991 |
| WO | WO-2004005014 A2 | 1/2004 |

OTHER PUBLICATIONS

Extended European Search Report issued by Examiner Federico Zattoni, of the European Patent Office, dated Mar. 31, 2017, in corresponding European Patent Application No. 16195798.0.

* cited by examiner

*Primary Examiner* — Binu Thomas
(74) *Attorney, Agent, or Firm* — Locke Lord LLP; Scott D. Wofsy; Daniel J. Fiorello

(57) ABSTRACT

A cap for an additive manufacturing recoater rake includes a clip portion defining a slot configured to receive a side edge portion of a recoater rake, and an angled surface extending from the clip portion. The angled surface is configured to contain powder pushed by the recoater rake on the powder bed.

18 Claims, 4 Drawing Sheets

RAKE SYSTEMS FOR ADDITIVE MANUFACTURING SYSTEMS

BACKGROUND

1. Field

The present disclosure relates to additive manufacturing, more specifically to rake systems for powder beds of additive manufacturing systems.

2. Description of Related Art

Existing powder bed fusion devices (e.g., the ProX 300 Powder Bed Additive Manufacturing Process from 3D Systems) have recoaters that utilize a deployable flat rake to gather powder from the powder feed bed and to deposit the powder on the build plate for roller compaction. Powder has a tendency to fall away from the feed and build area as it is pushed.

Such conventional methods and systems have generally been considered satisfactory for their intended purpose. However, there is still a need in the art for improved rake systems. The present disclosure provides a solution for this need.

SUMMARY

In accordance with at least one aspect of this disclosure, a cap for an additive manufacturing recoater rake includes a clip portion defining a slot configured to receive a side edge portion of a recoater rake, and an angled surface extending from the clip portion. The angled surface is configured to contain powder pushed by the recoater rake on the powder bed.

The angled surface can be angled about 45 degrees or more relative to the direction of motion of the recoater rake. Any other suitable angle is contemplated herein (e.g., greater than 0 degrees and less than 90 degrees).

The cap can be made of plastic, metal, or any other suitable material. The slot can be wider on one side of the cap than another side of the cap (e.g., to accommodate an irregular shaped rake). In certain embodiments, the cap can be configured to be removable from the recoater rake.

In accordance with at least one aspect of this disclosure, a kit can include at least one cap for an additive manufacturing recoater rake as described above. In accordance with at least one aspect of this disclosure, an additive manufacturing device can include a recoater rake configured to push powder onto a build platform, and two caps as described herein disposed on opposing side edge portions of the recoater rake.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1A:
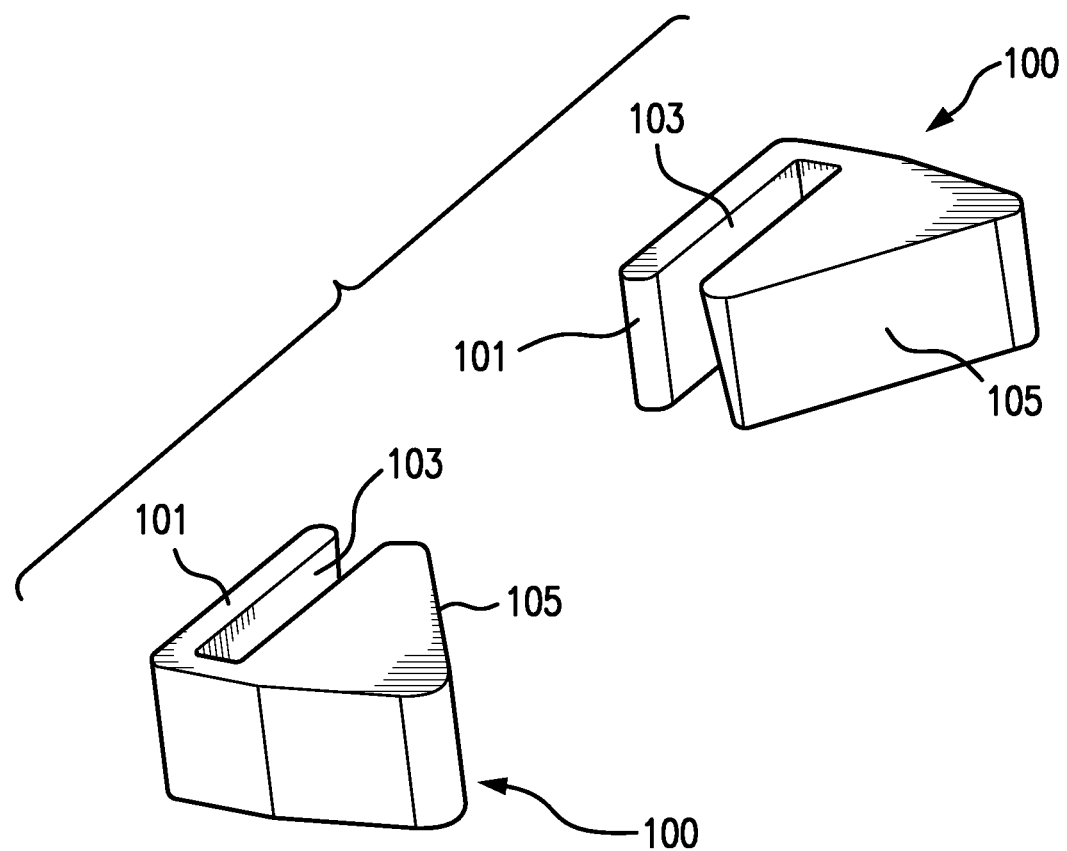
FIG. 1A is a perspective view of an embodiment of a pair of caps in accordance with this disclosure.
Figure 1B:
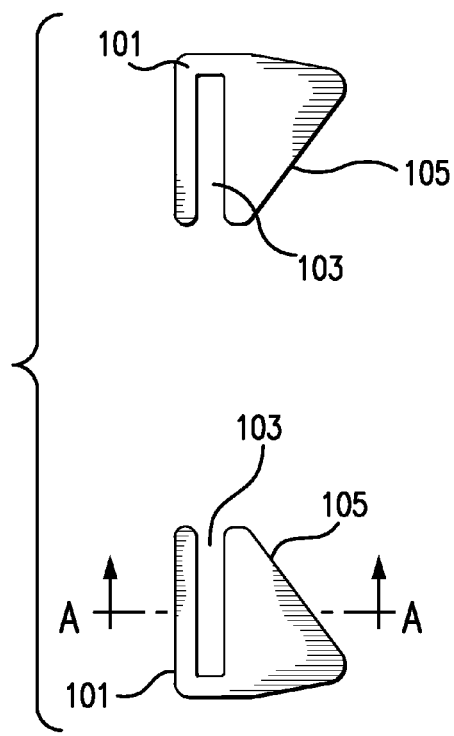
FIG. 1B is a plan view of the caps of FIG. 1A.

Reference will now be made to the drawings wherein like reference numerals identify similar structural features or aspects of the subject disclosure. For purposes of explanation and illustration, and not limitation, an illustrative view of embodiments of cap in accordance with the disclosure is shown in FIG. 1A and is designated generally by reference character 100. Other embodiments and/or aspects of this disclosure are shown in FIGS. 1B-2C. The systems and methods described herein can be used to contain powder on a powder bed of an additive manufacturing system.

Figure 1C:
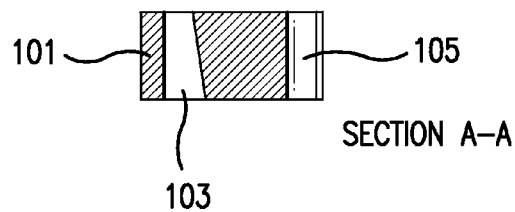
FIG. 1C is a cross-sectional side view of one of the caps of FIG. 1A.
Figure 1D:
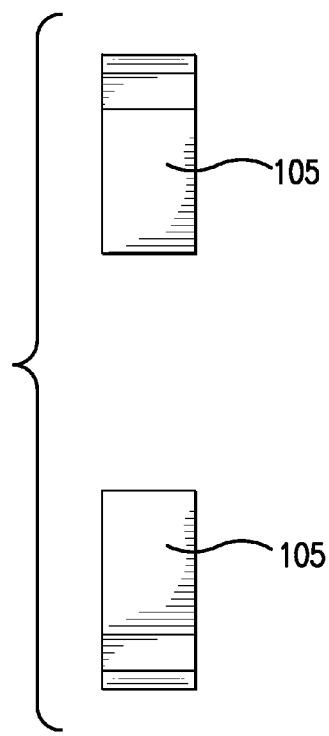
FIG. 1D is a front view of the caps of FIG. 1A.
Figure 2A:
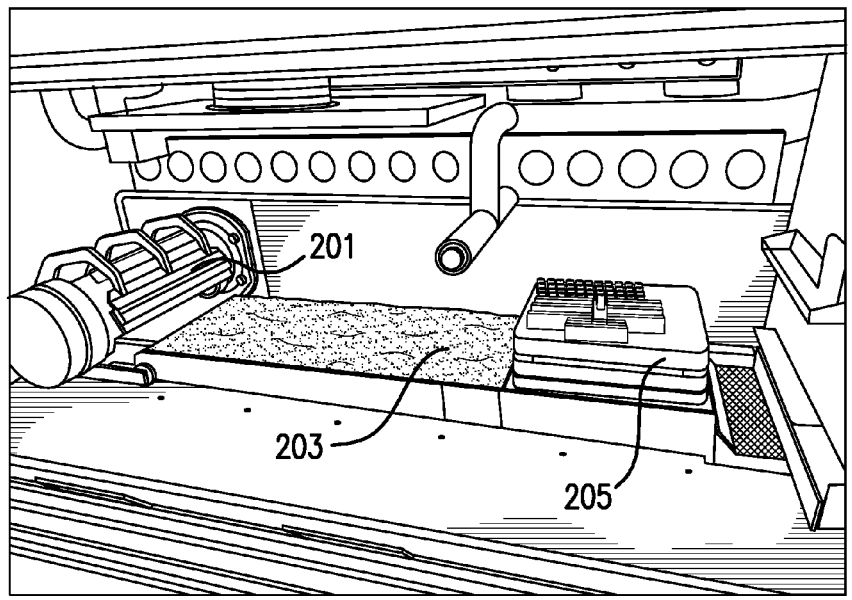
FIG. 2A is a perspective view of an embodiment of a system in accordance with this disclosure.
Figure 2B:
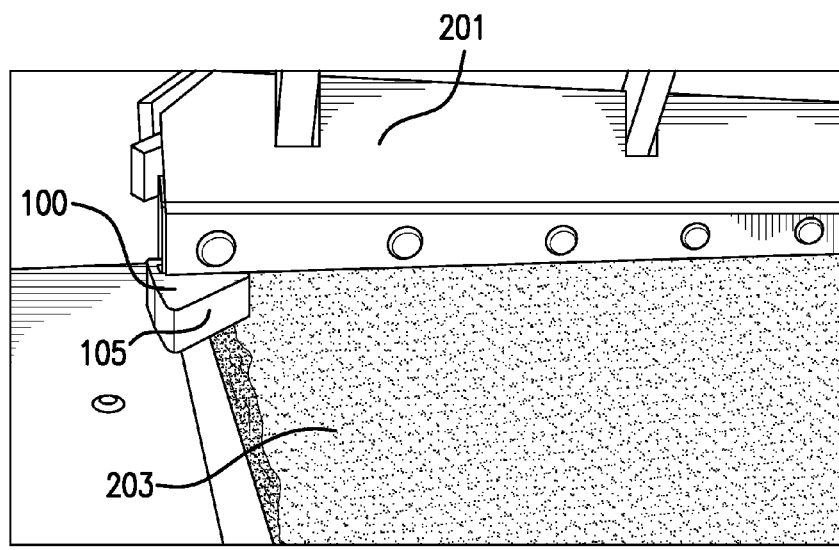
FIG. 2B is a perspective view of a recoater rake including the caps of FIG. 1A disposed thereon, shown before pushing powder toward the build plate.
Figure 2C:
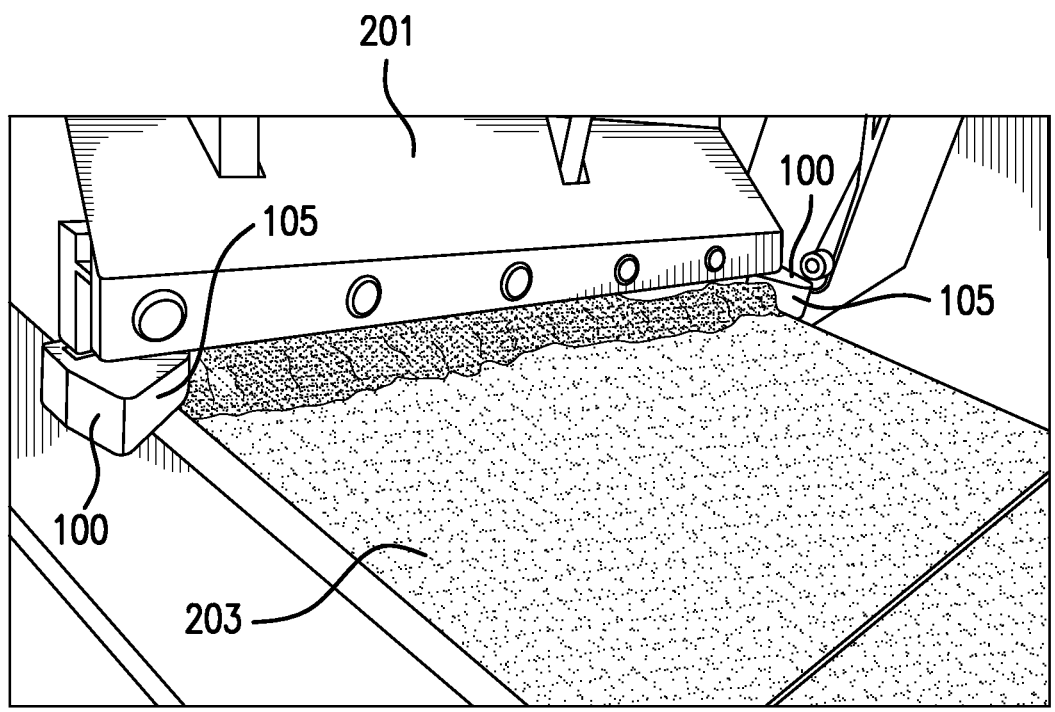
FIG. 2C is a perspective view of a recoater rake of FIG. 2B, shown pushing powder toward the build plate.

Referring to FIG. 1A-1D, a cap 100 for an additive manufacturing recoater rake includes a clip portion 101 defining a slot 103 configured to receive a side edge portion of a recoater rake (e.g., rake 201 as shown in FIGS. 2A-2C), and an angled surface 105 extending from the clip portion 101. The angled surface 105 is configured to contain powder pushed by the recoater rake 201 on the powder bed 203. While FIGS. 1A-1D show a pair of caps 100, each cap is the same, merely mirrored in shape to fit opposing side edges of rake 201.

The angled surface 105 can be angled about 45 degrees or more relative to the direction of motion of the recoater rake 201. Any other suitable angle able to contain powder on the powder bed is contemplated herein (e.g., greater than 0 degrees and less than 90 degrees).

The cap 100 can be made of plastic, metal, or any other suitable material (e.g., heat treated steel). As shown in FIG. 1C, the slot 103 can be wider on one side of the cap than another side of the cap 100 (e.g., to accommodate an irregular shaped rake). In certain embodiments, the cap 100 can be configured to be removable from the recoater rake 201.

In accordance with at least one aspect of this disclosure, a kit can include at least one cap 100 for an additive manufacturing recoater rake 201 as described above. In accordance with at least one aspect of this disclosure, an additive manufacturing device 200 can include a recoater rake 201 configured to push powder onto a build platform 205, and two caps 100 as described above disposed on opposing side edge portions of the recoater rake 201. The caps 100 can be attached to the rake 201 in any suitable fashion (e.g., silicon adhesive, a fastener).

While the embodiments of the caps 100 are shown as separate from the rake 201, it is contemplated that the caps could be integrally formed with the rake 201.

As disclosed above, embodiments includes angled surfaces that are configured to attach to the ends of the flat rake can act in a snowplow fashion to keep powder from leaving the feed area. Such caps are designed in such a way to guide powder that would otherwise displace to the side back towards the feed area. Powder is the largest cost contributor for an additive manufacturing build. Powder falling away from the feed and build area is waste that must be recycled at cost. Thus, by containing the powder with these embodiments of caps 100 as described above, less powder is required per build and the process is ultimately more efficient.

The methods and systems of the present disclosure, as described above and shown in the drawings, provide for additive manufacturing systems with superior properties including reduced powder loss. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A cap for an additive manufacturing recoater rake, comprising:
    a clip portion defining a slot configured to receive a side edge portion of a recoater rake; and
    an angled surface extending from the clip portion and configured to laterally extend inward from the edge of the recoater rake to contain powder pushed by the recoater rake on a powder bed.

2. The cap of claim 1, wherein the angled surface is angled about 45 degrees or more relative to the direction of motion of the recoater rake.

3. The cap of claim 1, wherein the cap is made of plastic.

4. The cap of claim 1, wherein the cap is made of metal.

5. The cap of claim 1, wherein the slot is wider on one side of the cap than another side of the cap.

6. The cap of claim 1, wherein the cap is configured to be removable from the recoater rake.

7. A kit, comprising:
    at least two caps for an additive manufacturing recoater rake, each cap comprising:
        a clip portion defining a slot configured to receive a side edge portion of a recoater rake; and
        an angled surface extending from the clip portion and configured to laterally extend inward from the edge of the recoater rake to contain powder pushed by the recoater rake on a powder bed.

8. The kit of claim 7, wherein the angled surface is angled about 45 degrees or more relative to the direction of motion of the recoater rake.

9. The kit of claim 7, wherein the cap is made of plastic.

10. The kit of claim 7, wherein the cap is made of metal.

11. The kit of claim 7, wherein the slot is wider on one side of the cap than another side of the cap.

12. The kit of claim 7, wherein the cap is configured to be removable from the recoater rake.

13. An additive manufacturing device, comprising:
    a recoater rake configured to push powder onto a build platform; and
    two caps disposed on opposing side edge portions of the recoater rake, comprising:
        a clip portion defining a slot configured to receive a side edge portion of a recoater rake; and
        an angled surface extending from the clip portion and configured to laterally extend inward from the edge of the recoater rake to contain powder pushed by the recoater rake on a powder bed.

14. The device of claim 13, wherein the angled surface of each cap is angled about 45 degrees or more relative to the direction of motion of the recoater rake.

15. The device of claim 13, wherein each cap is made of plastic.

16. The device of claim 13, wherein each cap is made of metal.

17. The device of claim 13, wherein the slot of each cap is wider on one side of the cap than another side of the cap.

18. The device of claim 13, wherein each cap is removable from the recoater rake.

* * * * *